United States Patent
Trappier et al.

(10) Patent No.: US 11,643,944 B2
(45) Date of Patent: May 9, 2023

(54) TURBINE SHAFT OF A TURBOMACHINE AND METHOD FOR PROTECTING AGAINST OVERSPEED OF SAID SHAFT

(71) Applicant: SAFRAN AIRCRAFT ENGINES, Paris (FR)

(72) Inventors: Nicolas Xavier Trappier, Moissy-Cramayel (FR); Pierrot Guillou, Moissy-Cramayel (FR); Caroline Marie Frantz, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 39 days.

(21) Appl. No.: 17/040,935

(22) PCT Filed: Mar. 20, 2019

(86) PCT No.: PCT/FR2019/050631
§ 371 (c)(1),
(2) Date: Sep. 23, 2020

(87) PCT Pub. No.: WO2019/186028
PCT Pub. Date: Oct. 3, 2019

(65) Prior Publication Data
US 2021/0017880 A1    Jan. 21, 2021

(30) Foreign Application Priority Data
Mar. 27, 2018 (FR) ...................... 1852616

(51) Int. Cl.
*F01D 5/06* (2006.01)
*F01D 21/02* (2006.01)

(52) U.S. Cl.
CPC ............... *F01D 21/02* (2013.01); *F01D 5/06* (2013.01); *F05D 2240/60* (2013.01)

(58) Field of Classification Search
CPC . F01D 5/02; F01D 5/026; F01D 21/02; F05D 2240/60; F05D 2240/61; F05D 2260/94
See application file for complete search history.

(56) References Cited

U.S. PATENT DOCUMENTS 6,447,248 B1 * 9/2002 Kastl .................. F01D 21/045
                                                   384/624
8,057,160 B2  11/2011 Bart et al.
(Continued)

FOREIGN PATENT DOCUMENTS

EP   1640564 A1    3/2006
EP   3205840 A1 *  8/2017 ............. F01D 21/00
(Continued)

OTHER PUBLICATIONS

Written Opinion of the International Searching Authority dated Jun. 25, 2019, issued in corresponding International Application No. PCT/FR2019/050631, filed Mar. 20, 2019, 4 pages.
(Continued)

*Primary Examiner* — David E Sosnowski
*Assistant Examiner* — Jason G Davis
(74) *Attorney, Agent, or Firm* — Christensen O'Connor Johnson Kindness PLLC (57) ABSTRACT

A turbine shaft of a turbomachine extending along a longitudinal axis (A) includes a main tubular portion with a length L1 and a maximum outer main diameter. The shaft further includes a secondary tubular segment with a length L2 and a maximum outer secondary diameter greater than the maximum outer main diameter. The secondary tubular segment extends radially from the shaft such that the main tubular portion extends on either side of the secondary tubular segment along the longitudinal axis (A). The secondary tubular segment includes a weak point that is configured to break the shaft into two distinct parts when the value of a tangential stress applied to the shaft exceeds a
(Continued)

predetermined threshold value, and thus cause retraction of the turbine.

20 Claims, 4 Drawing Sheets

(56) References Cited

U.S. PATENT DOCUMENTS

| | | | |
|---|---|---|---|
| 8,127,525 B2 | 3/2012 | Bart et al. | |
| 8,266,886 B2 * | 9/2012 | McCune | F01D 21/04 |
| | | | 60/779 |
| 9,752,511 B2 * | 9/2017 | McCune | F02C 3/107 |
| 10,107,116 B2 * | 10/2018 | Congratel | F01D 21/045 |
| 10,473,164 B2 * | 11/2019 | Slayter | F02C 7/275 |
| 2006/0251506 A1 | 11/2006 | Soupizon | |
| 2017/0175753 A1 | 6/2017 | Tan-Kim et al. | |
| 2019/0277156 A1 | 9/2019 | Negri et al. | |

FOREIGN PATENT DOCUMENTS

| | | |
|---|---|---|
| EP | 3296525 A1 | 3/2018 |
| FR | 2752024 A1 | 2/1998 |
| FR | 2907840 A1 | 5/2008 |
| FR | 2916483 A1 | 11/2008 |
| FR | 3022890 A1 | 1/2016 |
| FR | 3049646 A1 | 10/2017 |

OTHER PUBLICATIONS

International Preliminary Report on Patentability dated Sep. 29, 2020, issued in corresponding International Application No. PCT/FR2019/050631, filed Mar. 20, 2019, 1 page.

International Search Report dated Jun. 25, 2019, issued in corresponding International Application No. PCT/FR2019/050631, filed Mar. 20, 2019, 5 pages.

Written Opinion of the International Searching Authority dated Jun. 25, 2019, issued in corresponding International Application No. PCT/FR2019/050631, filed Mar. 20, 2019, 5 pages.

* cited by examiner

TURBINE SHAFT OF A TURBOMACHINE AND METHOD FOR PROTECTING AGAINST OVERSPEED OF SAID SHAFT

TECHNICAL FIELD

The present invention relates to a turbine shaft of a turbomachine, as well as a method for protecting against overspeed of said turbine shaft.

BACKGROUND

The prior art includes in particular documents EP-A1-3 296 525, FR-A1-2 752 024 and FR-A1-3 022 890.

Typically, an aircraft turbomachine, e.g. a turbojet engine, comprises, from upstream to downstream in the direction of gas flow, a fan, one or more compressors arranged in series, e.g. a low-pressure compressor and a high-pressure compressor, a combustion chamber, one or more turbines, e.g. a low-pressure turbine and a high-pressure turbine, and a nozzle.

The fan generates an air flow, a part of which feeds the aforementioned components of the turbomachine and forms a primary flow in a primary duct, and another part flows in a secondary duct which extends around the primary duct and forms a secondary air flow, which generates a main part of the thrust of the turbomachine. A compressor is configured to increase the pressure of the air, which is then supplied to the combustion chamber. In the combustion chamber, air is mixed with fuel and burned. The combustion gases then pass through a turbine, which rotates a compressor, taking some of the pressure energy from the gases leaving the combustion chamber and converting it into mechanical energy. The nozzle allows exhaust gases to be ejected to also produce a propulsion force for the turbomachine.

In some turbomachine architectures a reduction gear is integrated between the low-pressure turbine and the fan, to allow the turbine and the fan to operate at different speeds, the turbine having a higher rotational speed than the fan.

In particular, the rotor of the low-pressure turbine is coupled to the fan via the reduction gear, a shaft connecting the rotor of the low-pressure turbine to the reduction gear and a shaft connecting the reduction gear to the fan. The axial position of a shaft is, in particular, determined by a thrust bearing which holds the shaft in the axial direction and prevents it from moving along its axis, and by its coupling to the reduction gear.

Functional hazard analysis (FHA) of a turbomachine have established the causes of events that can lead to catastrophic conditions for the aircraft, such as the uncontained high energy debris (UHED).

A first event that can lead to the bursting of a turbine disk, and therefore to the release of high-energy debris, is heating within the turbomachine, which can degrade the mechanical characteristics of the components of the turbomachine.

A second event that can lead to the bursting of a turbine disc is an increase in the operating speed of the turbomachine, which can generate an increase in stress in the turbine disc. An increase in the operating speed of the turbomachine can result in overspeed of a turbine rotor, which is normally a very rare phenomenon and is to be avoided.

A primary cause of this second event may be a breakage of a drive shaft between a turbine and a compressor or the fan, either upstream or downstream of an axial abutment on the drive shaft.

For example, overspeed can occur when the shaft connecting the rotor of the low-pressure turbine to the reduction gear or the shaft connecting the reduction gear to the fan breaks, or when an inner component of the reduction gear breaks. When one of these shafts or the inner component of the reduction gear breaks, the rotor of the turbine is consequently mechanically uncoupled from the fan, which then no longer exerts resistive torque on this shaft and therefore no longer limits its rotational speed.

However, the moving vanes arranged on the rotor of the turbine continue to be driven in rotation by the gases exiting the combustion chamber of the turbomachine. The turbine then goes into overspeed, subjecting the turbine rotor to excessive centrifugal forces that are likely to cause it to burst, resulting in the risk of perforation of the outer casing of the turbine, but also of the aircraft fuselage. The overspeed is therefore a risky phenomenon for the turbomachine and the passengers of the aircraft, so it is advisable to anticipate the consequences of such a phenomenon.

In this type of architecture, in the event of overspeed of the turbine rotor, the integrity of the rotor part downstream of the drive shaft thrust bearing is not guaranteed.

A second cause of this second event may be a full opening, i.e., mechanical abutment, of a fuel metering valve (FMV) of the turbomachine.

A third cause of this second event may be an over-closure of the variable stator vanes (VSV) that control the air flow that circulates through a compressor.

According to the cause of the second event, its impact will be more or less significant according to the rotor of the turbomachine. For example, the rotor of the low-pressure turbine is more sensitive to the breakage of the drive shaft, which leads to a loss of the resistive torque of the fan, than to a closure of the VSVs of the low-pressure compressor.

The overspeed limitation is therefore an imperative constraint to be observed in the turbomachines.

The first cause of this second event, i.e. the breakage of the drive shaft, leads to the most critical case in overspeed of the rotor of the turbine.

Solutions to protect against overspeed in a turbomachine have already been implemented.

In the event of breakage of the shaft downstream of the thrust bearing, a technical solution has thus been proposed which consists, within the same stage of a turbine, of providing vanes of a stator blade with an area in the form of an axial deviation of the shape of said vanes known as "cambered". The breakage of the shaft downstream of the thrust bearing results in a displacement of the rotor of the turbine, under the action of the gas pressure on the vanes of the rotor, in the direction of the stator of the turbine, since the turbine is no longer connected to the thrust bearing. When it moves backwards upon breakage of the shaft of the turbine, a blading of the turbine rotor sees the moving vanes of its blading contacting the cambered area of the vanes of the stator. This destroys the blades of the moving vanes and thus slows down the rotation of the rotor of the turbine. This destruction operation is, for this reason, known as the "plucking" of the turbine.

This solution has the disadvantage of not allowing the most aerodynamic definition of the stator vanes, due to the presence of the cambered areas on these vanes.

Furthermore, this solution only allows the turbine to be stopped in the event of axial displacement of the turbine shaft occurring in the event of a breakage of this shaft, but not in the event of a breakage of the fan shaft or a breakage of an inner component of the reduction gear, as these types of breakage do not cause axial displacement of the turbine shaft. However, this type of breakage is dangerous, as it is likely to cause the turbine rotor to overspeed.

In the event of breakage of the shaft upstream of the thrust bearing, the rotor of the turbine does not move backwards and accelerates strongly.

It has therefore been suggested that the fuel supply to the combustion chamber be cut off to eliminate the energy source by which the rotor is accelerated. Specifically, a sensor was incorporated in the rear of the engine to detect if the overspeed value of the turbomachine exceeds a threshold value, and consequently trigger the cut-off of fuel supply to the combustion chamber.

However, for this technical solution, it is necessary to take into account a detection time which makes it possible to check that the overspeed value exceeds the threshold value, followed by a fuel cut-off time.

In addition, the fuel cut-off device alone does not allow the rotor of the turbine to slow down quickly, which impairs its efficiency.

In addition, stopping or slowing down the rotor is solely dependent on the fuel cut-off system. This is particularly detrimental for small engines, where the lower inertia of the turbine rotor creates a risk to start quicker the overspeed, and where the bursting of the turbine discs can occur before the fuel cut-off has been able to sufficiently slow the rotor.

A technical solution has also been proposed to combine the cambered area of the vanes of the stator and the use of a sensor to detect whether the value of the overspeed of the turbomachine exceeds a threshold value. When the shaft breaks between a thrust bearing, such as a ball bearing arranged downstream of the reduction gear, and the low-pressure turbine, the cambered of the vanes of the stator provide a low overspeed level because the rotor of the low-pressure turbine moves backwards. When the shaft breaks between the thrust bearing and another bearing, such as a roller bearing between the fan and the reduction gear, the rotor of the turbine does not move backwards. Indeed, the thrust bearing allowing to keep the shaft in the axial direction and to prevent the shaft from moving along its axis, it prevents the rotor of the turbine from moving backwards. As a result, the cambered of the vanes of the stator is not effective, so the sensor can detect whether the overspeed value of the turbomachine exceeds a threshold value, and consequently trigger the cut-off of the fuel supply to the combustion chamber. The overspeed level reached is low, because the inertia of the shaft and the low-pressure compressor add up to the inertia of the low-pressure turbine, and the low-pressure compressor allows not to consider that all the torque is released.

An overspeed limiting device of the shaft of the turbine was proposed in the patent application FR-A1-2 907 840, comprising means for shearing moving vanes of a turbine stage comprising means for projecting a pin into the path of the moving vanes, so as to cause the vanes of the turbine stage to burst when a breakage of the shaft is detected.

An overspeed limiting device of the shaft of the turbine was proposed in application FR-A1-3 049 646, comprising means for destroying the moving vanes of a turbine stage comprising means for projecting a projectile into the path of the moving vanes so as to cause destruction of the turbine stage when overspeed is detected.

A braking device was proposed in the application FR-A1-2 916 483, allowing, in the event of a shaft breakage, to bring the rotor to a rapid stop. According to this technical solution, the braking system comprises a cutting element, e.g. attached to the rotor, and a ring-shaped element, e.g. attached to the stator. The elements are configured to come into contact by axial movement of the rotor after the shaft has broken, with the cutting element cutting the ring-shaped element.

The patent application EP-A1-1 640 564 proposes means for braking the rotor of the turbine in the event of a breakage in the shaft of the turbine in order to bring the turbine to a rapid stop. According to this technical solution, destructive means are arranged to shear the vanes of an upstream rotor disc at the beginning of a downstream rotor movement resulting from the breakage of the shaft.

The invention aims in particular at providing a simple, economical and effective solution to allow the stopping of a rotor in case of overspeed.

SUMMARY OF THE INVENTION

For this purpose, the invention relates to a turbine shaft of a turbomachine extending along a longitudinal axis, comprising a main tubular portion of length L1 and having a given maximum outer main diameter, characterised in that it comprises a secondary tubular segment of length L2 and having a maximum outer secondary diameter larger than the maximum outer main diameter, the secondary tubular segment extending radially projecting from the shaft such that the main tubular portion extends on either side of the secondary tubular segment along the longitudinal axis, the secondary tubular segment comprising a weak section configured to break the shaft into two distinct parts when the value of a tangential stress applied to the shaft exceeds a predetermined threshold value.

Advantageously, the weak section is configured to be the only one to break the shaft into two distinct parts when the value of a tangential stress applied to the shaft exceeds a predetermined threshold value.

Advantageously, the weak section arranged on the secondary tubular segment of the shaft makes it possible to have the tangential stress which generates the breakage of the weak section. Indeed, as the secondary tubular segment has a secondary diameter larger than the main diameter of the main tubular portion, it is the tangential stress that generates the breakage of the weak section, and not a torsional stress due to the torque.

Furthermore, the weak section of the turbine shaft according to the invention makes it possible, in the event of an overspeed start resulting from the breakage of said shaft downstream of a thrust bearing, to cause the rotor of the turbine to move backwards.

Thus, the weak section ensures that all cases of the shaft breakage lead to a backward movement of the turbine, and not only the cases of shaft breakage downstream of the thrust bearing, as in the prior art.

The backward movement of the turbine rotor allows the vanes of the rotor to be broken, e.g. through a cambered of the stator vanes, and thus slows down said rotor.

In addition, the weak section reduces the performance requirement of the electronic protection systems used in the prior art. Indeed, as the weak section ensures that all cases of shaft breakage lead to a backward movement of the rotor of the turbine, and therefore to a plucking of the vanes of the rotor, these systems are now only intended to protect the turbomachine from cases of full opening of the FMV and closing of the VSV.

In addition, such a turbine shaft allows an optimized dimensioning of the turbine, which makes it possible to reduce the speed reached by the rotor of the turbine after the breakage of the shaft, and thus to have an optimal dimensioning of the turbine discs, which finally makes it possible to reduce the weight and size of the turbine.

The maximum outer secondary diameter can be at least 1.8 times larger than the maximum outer main diameter.

Preferably, the weak section comprises a thinned portion whose maximum inner diameter is larger than a minimum inner secondary diameter of said secondary tubular segment, and whose maximum outer diameter is equal to the maximum outer secondary diameter.

The thinned portion may extend over not more than 80% of the length L2.

Advantageously, the thinned portion extending over at most 80% of the length L2 allows to concentrate all tangential stresses on the thinned portion, while allowing to have a weak section on said secondary tubular segment intended to break when the value of the tangential stress applied to the shaft exceeds a predetermined threshold value.

The length L2 is greater than 0.3 times the maximum outer diameter of the thinned portion in order to avoid transmitting the tangential stresses to the rest of the shaft.

The thinned portion may comprise at least one or a plurality of teeth which extend radially projecting from the thinned portion. The plurality of teeth may be evenly distributed over the thinned portion.

Preferably at least one through-hole is formed in the secondary tubular segment.

Advantageously, the through-hole makes it possible to optimize the weak section by decorrelating the torsional and tangential stresses. In addition, the through-hole advantageously allows the evacuation of oil which may have accumulated in the event of a leak in a lubricated enclosure extending around the shaft.

The weak section can be formed on at least one angular sector of the secondary tubular segment.

The invention also relates to a turbomachine, in particular of an aircraft, comprising a turbine comprising a turbine shaft according to the invention, the secondary tubular segment being arranged downstream of a thrust bearing for guiding the shaft.

The invention also relates to a method for protecting against overspeed of a turbine shaft according to the invention, comprising a step of breaking the weak section when the value of a tangential stress applied to the shaft exceeds a predetermined threshold value.

DESCRIPTION OF THE FIGURES

The invention will be better understood and other details, characteristics and advantages of the invention will appear more clearly when reading the following description as a non-limitative example and with reference to the annexed drawings in which.

DETAILED DESCRIPTION

Figure 1:
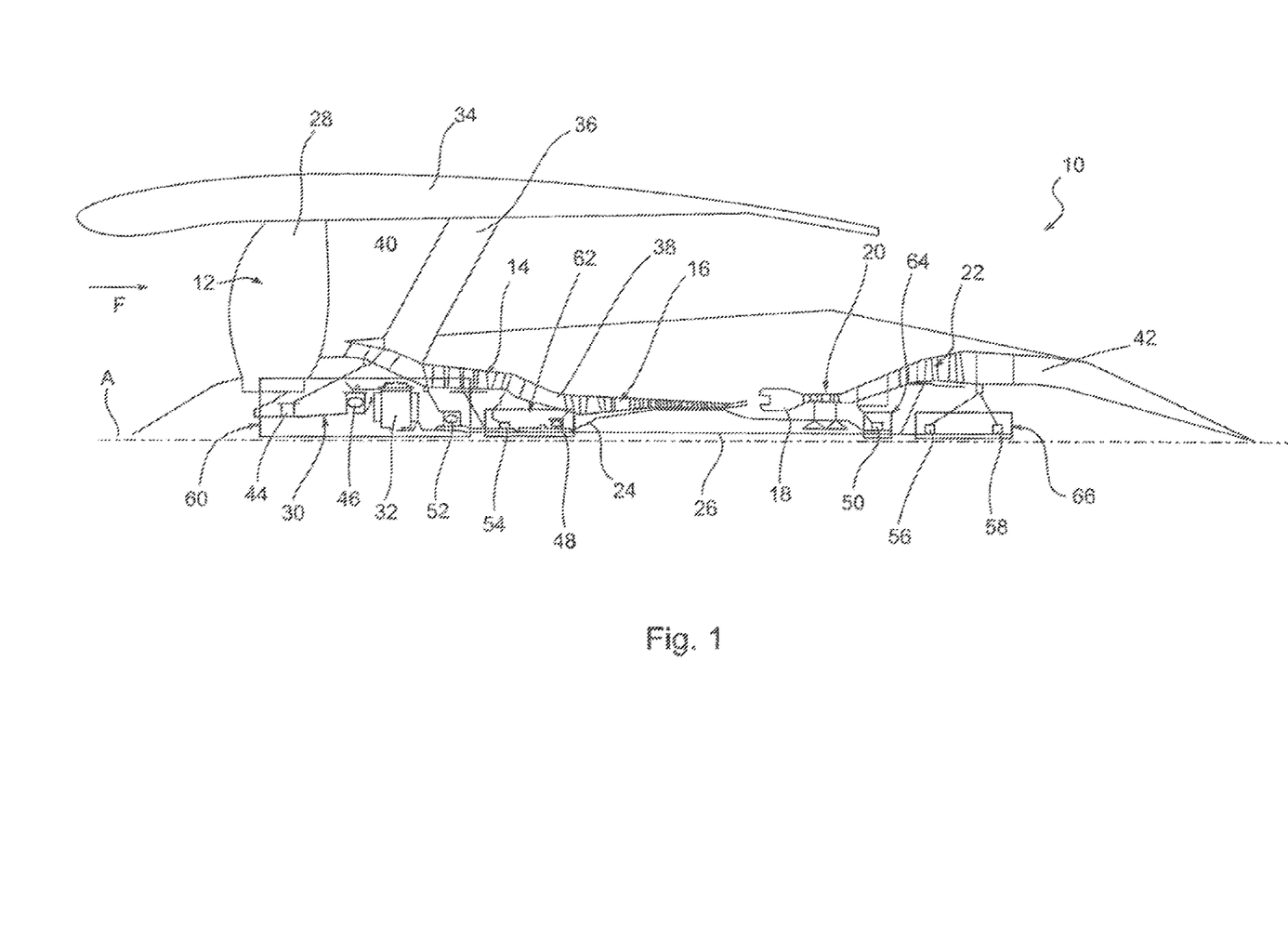
FIG. 1 is a half-view in axial section of a turbomachine according to the prior art.

FIG. 1 shows an aircraft turbomachine 10, which is here a turbofan engine with dual flow and dual casing. In a known manner, the turbomachine 10 comprises, from upstream to downstream in the direction of flow of the gas flow F in the turbomachine, a fan 12, a low-pressure compressor 14, a high-pressure compressor 16, an annular combustion chamber 18, a high-pressure turbine 20 and a low-pressure turbine 22.

The rotors of the high-pressure compressor 16 and the high-pressure turbine 20 are connected by a high-pressure shaft 24 and form a high-pressure body with it. The rotors of the low-pressure compressor 14 and the low-pressure turbine 22 are connected by a low-pressure shaft 26 and form a low-pressure casing. The high-pressure and low-pressure shafts extend along a longitudinal axis A of the turbomachine 10.

The fan 12 comprises blades 28 which are connected to a fan shaft 30. The fan shaft 30 can be connected to the low-pressure shaft 26 by means of a reduction gear 32, e.g. of the epicyclic train type.

The turbomachine 10 also comprises a fan casing 34 which extends around the blades 28, is carried by aerodynamic arms 36, and defines an inlet air duct of the flows F. A part of this air enters an inner annular flow duct 38 of a primary flow and the other part feeds an outer annular flow duct 40 of secondary flow. The duct 38 passes through the low-pressure 14 and high-pressure compressors 16, the combustion chamber 18, and the high-pressure 20 and low-pressure turbines 22. The outer duct 40 surrounds the compressor and turbine casings and joins the inner duct 38 at a nozzle 42 of the turbomachine 10.

The high-pressure 24, low-pressure 26 and fan 30 shafts are centred and guided in rotation around the axis A by bearings, e.g. rolling bearings. The fan shaft 30 is supported here by an upstream bearing 44 and a downstream bearing 46. The high-pressure shaft 24 is supported by an upstream bearing 48 and a downstream bearing 50, while the low-pressure shaft 26 is supported by four bearings 52, 54, 56 and 58.

The upstream 48 and downstream 50 bearings of the high pressure shaft 24 are usually mounted at least partly on the high pressure shaft.

The first bearing 52 of the low-pressure shaft 26 is located furthest upstream of the low-pressure shaft 26 and is mounted on the low-pressure shaft 26 and downstream of the reduction gear 32. The second, third and fourth bearings 54, 56, 58 of the low-pressure shaft 26 are mounted at least partly on the low-pressure shaft 26.

The turbomachine in FIG. 1 comprises four enclosures 60, 62, 64 and 66, namely an enclosure 60 housing the two fan bearings 44 and 46, the reduction gear 32 and the low-pressure bearing 52, an enclosure 62 housing the low-pressure bearing 54 and the upstream high-pressure bearing 48, an enclosure 64 housing the downstream high-pressure bearing 50, and an enclosure 66 housing the low-pressure bearings 56 and 58.

Because the rotational speed of the high-pressure shaft 24 is high, and the stresses transmitted from the rotors of the high-pressure compressor 16 and the high-pressure turbine 20 to the stators of the compressor and of the turbine through the upstream 48 and downstream 50 bearings, these bearings are lubricated and cooled as a result of the bearing heat from friction. Similarly, because the rotational speed of the low-pressure shaft 26 and the stresses transmitted from the rotors of the low-pressure compressor 14 and the low-pressure turbine 22 to the compressor and turbine stators by means of bearings 52, 54, 56 and 58 are high, these bearings are lubricated and cooled.

The lubrication of the bearings is generally carried out with oil and is carried out inside the enclosures 60, 62, 64 and 66, in order to limit the oil consumption of the turbomachine and to contain the oil to avoid any risk of ignition within the turbomachine 10.

Figure 2:
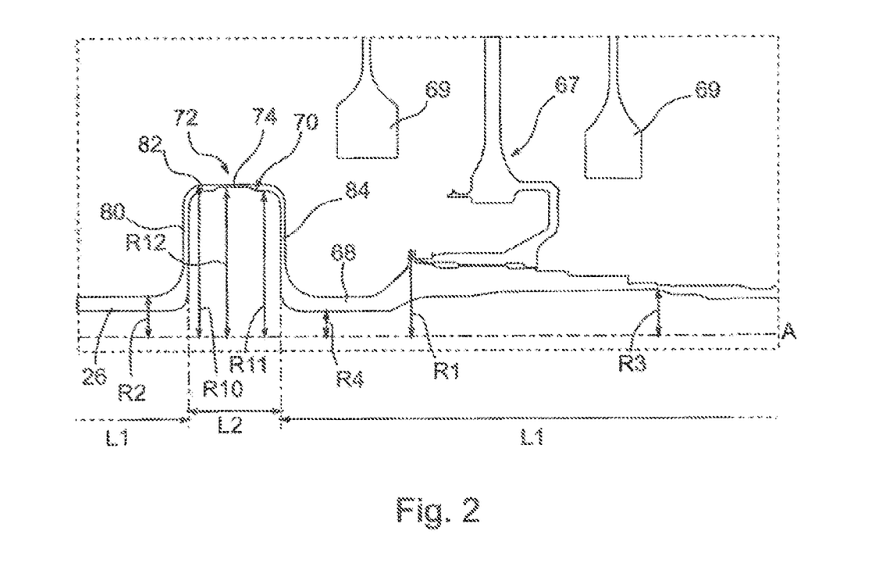
FIG. 2 is a half-view in axial section of a part of a turbomachine according to the invention.

FIG. 2 shows a turbine shaft of the turbomachine 10, here the low-pressure shaft 26, connecting means 67 between the low-pressure shaft 26 and the turbine rotor (not shown) and two discs 69 of the rotor of the turbine.

In accordance with the invention, and as shown in FIG. 2, the low-pressure shaft 26 comprises a main tubular portion 68 of length L1 and having a given maximum outer main diameter.

Since the turbine shaft has a tubular shape, the outer main diameter corresponds to the outer diameter of the main tubular portion 68, and the inner main diameter corresponds to the inner diameter of the main tubular portion 68.

The outer main diameter of the main tubular portion 68 may vary along the axis A. The maximum outer main diameter is defined as the largest outer diameter of the main tubular portion 68 along the axis A. Similarly, the minimum outer main diameter is defined as the smallest outer diameter of the main tubular portion 68 along the axis A. For example, in FIG. 2, the maximum outer main radius R1 and the minimum outer main radius R2 are shown.

The inner main diameter of the main tubular portion 68 may vary along the axis A. The maximum inner main diameter is defined as the largest inner diameter of the main tubular portion 68 along the axis A. Similarly, the minimum inner main diameter is defined as the smallest inner diameter of the main tubular portion 68 along the axis A. For example, in FIG. 2, the maximum inner main radius R3 and the minimum inner main radius R4 are shown.

In other words, the thickness of the main tubular portion 68, that is, the difference between the outer main radius and the inner main radius, may vary along the axis A.

The turbine shaft also comprises a secondary tubular segment 70.

In particular, the turbine shaft is monolithic, i.e. the main tube portion 68 and the secondary tube segment 70 are monolithic.

The secondary tubular segment 70 has a length L2 and a given maximum outer secondary diameter.

The outer secondary diameter corresponds to the outer diameter of the secondary tubular portion 70, and the inner secondary diameter corresponds to the inner diameter of the secondary tubular portion 70.

The outer secondary diameter of the secondary tubular portion 70 may vary along the axis A. The maximum outer secondary diameter is defined as the largest outer diameter of the secondary tubular portion 70 along the axis A. Similarly, the minimum outer secondary diameter is defined as the smallest outer diameter of the secondary tubular portion 70 along the axis A. For example, in FIG. 2, the maximum outer secondary radius R10 is shown.

The inner secondary diameter of the secondary tubular portion 70 may vary along the axis A. The maximum inner secondary diameter is defined as the largest inner diameter of the secondary tubular portion 70 along the axis A. Similarly, the minimum inner secondary diameter is defined as the smallest inner diameter of the secondary tubular portion 70 along the axis A. For example, in FIG. 2, the minimum inner secondary radius R11 is shown.

In other words, the thickness of the secondary tubular portion 70, i.e. the difference between the outer secondary radius and the inner secondary radius, may vary along the axis A.

The maximum outer secondary radius is larger than the maximum outer main radius.

Preferably, the maximum outer secondary diameter is at least 1.8 times larger than the maximum outer main diameter.

The length L2 may be less than the length L1, as shown in FIG. 2. In other words, the secondary tubular segment 70 may correspond to a local increase of the diameter of the shaft in relation to the main diameter. Of course, the length L2 can be approximately equal to or greater than the length L1.

Advantageously, the secondary tubular segment 70, the maximum outer secondary diameter of which is larger than the maximum outer main diameter of the main tubular portion 68, extending locally with respect to the main tubular portion 68, makes it possible to limit the size of the shaft.

The secondary tubular segment 70 may extend, for example, over one end of the shaft, or substantially in the middle of the shaft. More generally, the secondary tubular segment 70 can be arranged on any part of the shaft.

Preferably, the secondary tubular segment 70 extends radially protruding from the shaft 26, and thus from the main tubular portion 70, so that the main tubular portion 68 extends on either side of the secondary tubular segment 70 along the axis A.

In other words, the secondary tubular segment 70 is arranged so that on either side of the secondary tubular segment 70 the diameter of the shaft is smaller than the diameter of the secondary tubular segment 70.

Thus, a part of the main tubular portion 68 extends on one side of the secondary tubular segment 70 and another part of the main tubular portion 68 extends on the other side of the secondary tubular segment 70 along the axis A.

As shown in FIG. 2, the secondary tubular segment 70 has a general "U" shape. The secondary tubular segment 70 comprises a first portion 80 extending substantially radially with respect to the axis A, followed by a second portion 82 extending substantially axially, followed by a third portion 84 extending substantially radially with respect to the axis A. Thus, the second portion 82 connects the first and third portions 80, 84.

The length of the second portion 82 of the secondary tubular segment 70 is substantially equal to the length L2. The height, i.e. the radial dimension relative to the axis A, of the first and third portions 80, 84 of the secondary tubular segment 70 is substantially equal to the maximum outer secondary radius R10.

The secondary tubular segment 70 comprises a weak section 72 configured to break the shaft 26 into two distinct parts when the value of a tangential stress applied to the shaft exceeds a predetermined threshold value. In other words, the weak section 72 is intended to break when the value of a tangential stress applied to the shaft is greater than a threshold value. Advantageously, the weak section 72 is configured to be the only one to break the shaft 26 into two distinct parts when the value of a tangential stress applied to the shaft exceeds a predetermined threshold value.

The tangential stress depends on the density and tangential speed of the shaft. The tangential speed of the shaft depends on the rotational speed and the outer radius of the shaft.

As the shaft radius increases, the value of the tangential stress increases. Likewise, as the rotation speed of the shaft increases, the value of the tangential stress increases.

The value of the tangential stress can be determined by measuring the tangential speed of the shaft, since the density of the shaft is a determinable or given physical data. Specifically, the value of the tangential stress can be determined by measuring the rotational speed of the shaft, since the radius of the shaft is a determinable or given physical data.

A threshold value of the tangential stress can be determined by setting a maximum tangential shaft speed not to be exceeded, i.e. by setting a maximum shaft speed not to be exceeded.

Advantageously, the weak section 72 arranged on the secondary tubular segment 70 of the shaft, having a maximum outer secondary diameter larger than the maximum outer main diameter, makes it possible to have the tangential stress which generates the breakage of the weak section 72, and not a torsional stress due to the torque.

A torsional stress, also called shear stress, is dependent on the torque, the outer radius of the shaft or the calculated torsional stress and the inertia of the shaft, the inertia of the shaft being proportional to the diameter of the shaft.

As the radius of the calculated torsional stress increases, the inertia increases, and the value of the torsional stress decreases.

The main tubular portion 68 of the shaft is torque-sensitive, but not very sensitive to rotational speed. In other words, the tangential stress is low for the main tubular portion 68, while the shear stress is high.

The secondary tubular segment 70 of the shaft is sensitive to rotational speed, but not very sensitive to the torque. In other words, since the secondary tubular segment 70 has a maximum outer secondary diameter larger than the maximum outer main diameter, the tangential stress is high for the secondary tubular segment 70, while the shear stress is low.

The weak section 72 can be formed over at least one angular sector of the secondary tubular segment 70. In other words, only part of the secondary tubular segment 70 can form the weak section 72.

The weak section 72 can be formed over a plurality of angular sectors, e.g. evenly distributed, around the axis A.

The weak section 72 can be annular. In other words, the secondary tubular segment 70 can comprise the weak section 72 all around the axis A. In other words, the entire secondary tube segment 70 can form the weak section 72.

The weak section 72 may comprise a thinned portion 74. A thinned portion 74 corresponds to a portion of the weak section 72, and thus of the secondary tubular segment 70, whose thickness, i.e. the distance between the outer secondary radius and the inner secondary radius, is reduced in relation to the rest of the secondary tubular segment 70.

The thinned portion 74 may extend over not more than 80% of the length L2. Preferably, the thinned portion 74 extends over at least 50% of the length L2.

Advantageously, the thinned portion 74 extends over at most 80% of the length L2, which makes it possible not to weaken the secondary tubular segment 70, while making it possible to have a weak section on said secondary tubular segment configured to break the shaft into two distinct parts when the value of the tangential stress applied to the shaft exceeds a predetermined threshold value.

The thinned portion 74 can be formed on at least one angular sector of the weak section 72, and thus of the secondary tubular segment 70. In other words, only a part of the weak section 72 can comprise a thinned portion 74.

The thinned portion 74 can be formed on a plurality of angular sectors, for example evenly distributed, around the axis A.

The thinned portion 74 can be tubular. In other words, the weak section 72 may comprise, all around the axis A, a thinned tubular portion 74.

The outer diameter of the thinned tubular portion 74 may vary along the axis A. The maximum outer diameter of the thinned tubular portion 74 is defined as the largest outer diameter of the thinned tubular portion 74 along the axis A. Similarly, the minimum outer diameter of the thinned tubular portion 74 is defined as the smallest outer diameter of the thinned tubular portion 74 along the axis A. For example, in FIG. 2, the maximum outer radius of the thinned tubular portion 74 is equal to the maximum outer secondary radius R10.

The inner diameter of the thinned tubular portion 74 may vary along the axis A. The maximum inner diameter of the thinned tubular portion 74 is defined as the largest inner diameter of the thinned tubular portion 74 along the axis A. Similarly, the minimum inner diameter of the thinned tubular portion 74 is defined as the smallest inner diameter of the thinned tubular portion 74 along the axis A. For example, in FIG. 2, the maximum inner radius R12 of the thinned tubular portion 74 is shown, and is equal to the maximum inner secondary radius.

In particular, the maximum inner diameter of the thinned tubular portion 74 may be larger than the minimum inner secondary diameter. In other words, the maximum inner diameter of the thinned tubular portion 74 may be larger than the minimum inner diameter of the secondary tubular segment 68 outside the thinned tubular portion.

The maximum outer diameter of the thinned tubular portion 74 may be equal to the maximum outer secondary diameter. In other words, the maximum outer diameter of the thinned tubular portion 74 and the minimum outer diameter of the secondary tubular segment 68 may be equal.

The length L2 may be greater than 0.3 times the maximum outer diameter of the thinned tubular portion 74.

Figure 3:
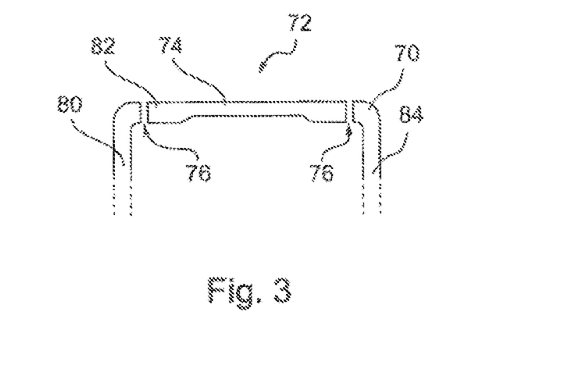
FIG. 3 is an enlarged axial section view of a part of a turbine shaft of a turbomachine according to the invention.
Figure 4:
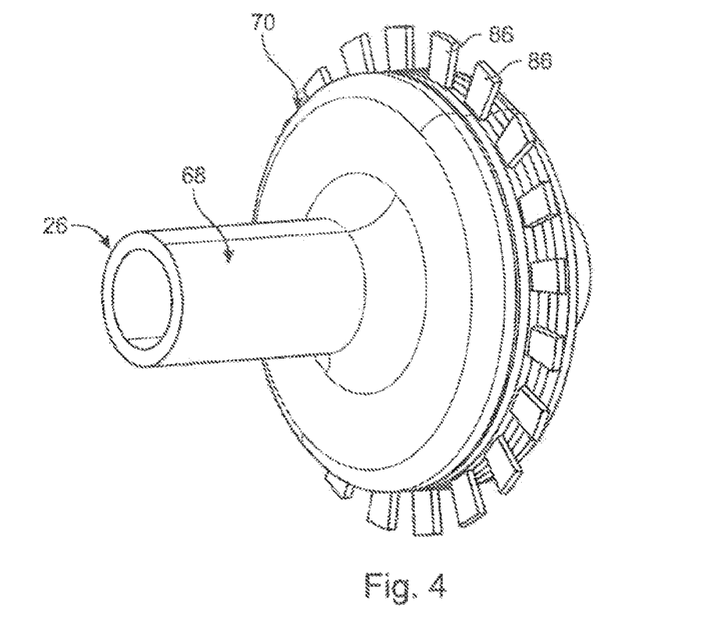
FIG. 4 is a perspective view of a turbine shaft of a turbomachine according to an embodiment of the invention.
Figure 5:
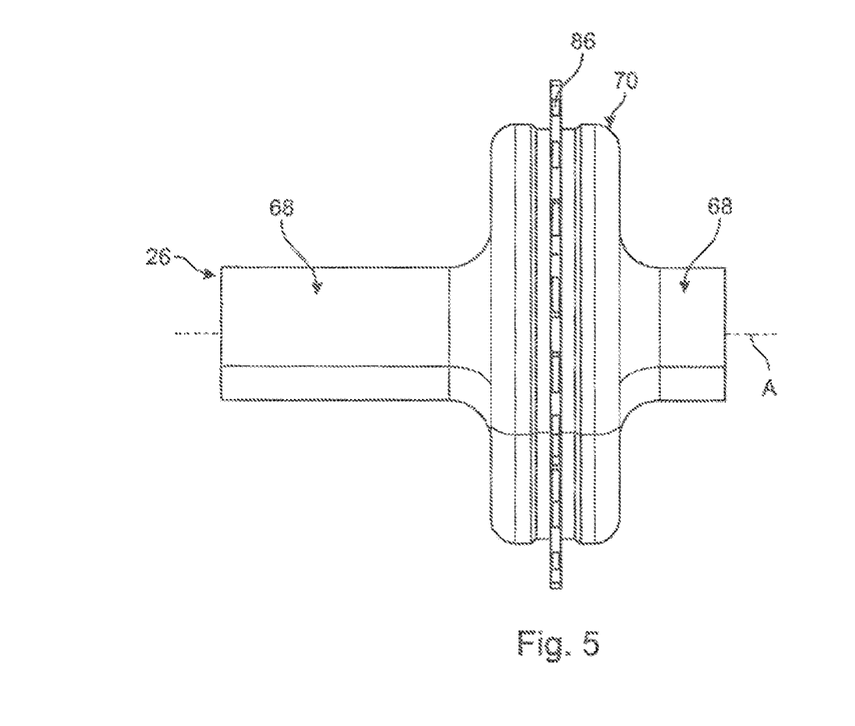
FIG. 5 is a side view of the turbine shaft of FIG. 4.
Figure 6:
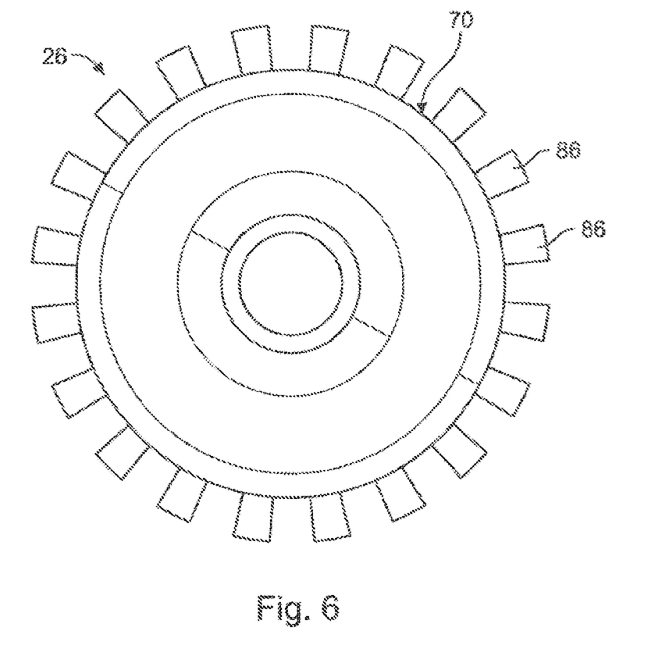
FIG. 6 is a front view of the turbine shaft of FIG. 4.

As shown in FIG. 3, the secondary tubular segment 70 may comprise one or more through-holes 76. For example, two through-holes 76 arranged on either side of the thinned portion 74 are shown in FIG. 3.

The through-holes 76 may be formed on an angular sector of the secondary tubular segment 70 around the axis A, or they may be evenly distributed over the secondary tubular segment 70 with respect to the axis A.

A through-hole 76 can be formed in the weak section 72, and more precisely in the thinned portion 74.

A through-hole 76 may have any cross-sectional shape, in particular a circular, oval or polygonal cross-section.

Advantageously, at least one through-hole 76 formed in the secondary tubular segment 70 allows the weak section 72 to decorrelate the torsional and tangential stresses. In other words, the presence of a through-hole in the secondary tubular segment allows the shaft to break at high speed, rather than at high torque.

In addition, a through-hole 76 allows for the removal of any oil that may have accumulated in the event of a leak in a lubricated enclosure 60, 62, 66 extending around the shaft.

The secondary tubular segment 70 can be arranged downstream of a thrust bearing for guiding the shaft. For example, the secondary tubular segment 70 can be arranged downstream of the bearing 56 of the low pressure shaft 26.

Advantageously, in the event of an overspeed start resulting from the breakage of the shaft, here the low-pressure shaft, downstream of the bearing 56, the weak section 72 allows the rotor of the low-pressure turbine 22 to move backwards, which allows the vanes of said rotor to be broken, for example via a cambered in the stator vanes of the low-pressure turbine 22, and consequently to slow down said rotor.

FIGS. 4 to 7 show an embodiment of the low-pressure shaft 26. This embodiment can be based on all the characteristics shown in FIGS. 1 to 3.

Figure 7:
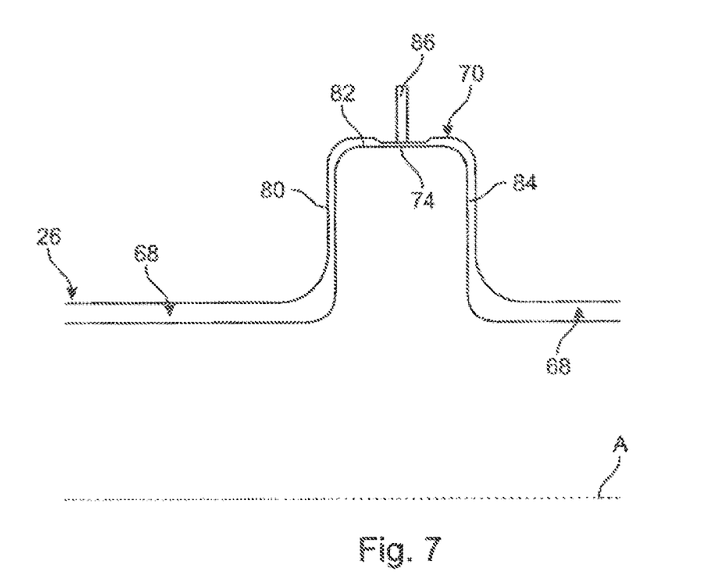
FIG. 7 is a half axial section view of the turbine shaft of FIG. 4.

In FIG. 7, the maximum outer radius of the thinned portion 74 is smaller than the maximum outer secondary radius R10 and the maximum inner radius of the thinned portion 74 is equal to the minimum inner secondary radius R11.

In addition, the secondary tubular segment 70, specifically the thinned portion 74 of the weak section 72, may comprise one or a plurality of radially extending teeth 86 protruding from the thinned portion 74.

The plurality of teeth 86 can be formed on at least one angular sector around the axis A, or on a plurality of angular sectors, e.g. evenly distributed, around the axis A, or all around the axis A.

The teeth 86 can be arranged substantially in the middle of the thinned portion 74.

A tooth 86 may be of a general parallelepipedal shape, as shown in FIGS. 4 to 7.

A tooth 86 may extend substantially radially to the axis A, as shown in FIG. 7.

The teeth 86 may be spaced apart so that teeth 86 are evenly distributed over the thinned portion 74. Alternatively, the teeth 86 can be unevenly distributed over the thinned portion 74.

The teeth 86 make it possible to locally increase the radius of the thinned portion 74, which makes it possible during an overspeed start by the centrifugal force, to be able to tear off the thinned portion 74 and thus to break the weak section 72.

The invention also relates to a method for protecting against overspeed of a turbine shaft as described above.

The method comprises a step of breaking the weak section 72 when the value of a tangential stress applied to the shaft exceeds a predetermined threshold value. In other words, the method comprises a step of breaking the turbine shaft into two distinct parts when the value of a tangential stress applied to the shaft exceeds a predetermined threshold value.

This breaking step advantageously allows the tangential stress that generates the breaking of the weak section, and not the torsional stress due to the torque. This allows advantageously a breakage of the weak section at high speed, and not at high torque.

The invention claimed is:

1. A turbine shaft of a turbomachine extending along a longitudinal axis (A), comprising a main tubular portion of length L1 and having a maximum outer main diameter, the turbine shaft further comprising a secondary tubular segment of length L2 and having a maximum outer secondary diameter larger than the maximum outer main diameter, the secondary tubular segment extending radially from the main tubular portion such that the main tubular portion extends on either side of the secondary tubular segment along the longitudinal axis (A), the secondary tubular segment comprising a weak section configured to break the shaft into two distinct parts when the value of a tangential stress applied to the shaft exceeds a predetermined threshold value, wherein the weak section comprises a thinned portion having a maximum inner diameter larger than a minimum inner secondary diameter of said secondary tubular segment, the thinned portion having a maximum outer diameter equal to the maximum outer secondary diameter.

2. The turbine shaft according to claim 1, wherein the maximum outer secondary diameter is at least 1.8 times larger than the maximum outer main diameter.

3. The turbine shaft according to claim 1, wherein the length L2 is greater than 0.3 times the maximum outer diameter of the thinned portion.

4. The turbine shaft according to claim 1, wherein the thinned portion extends over not more than 80% of the length L2.

5. The turbine shaft according to claim 1, wherein the thinned portion comprises at least one tooth that extends radially from the thinned portion.

6. The turbine shaft according to claim 1, wherein the thinned portion comprises a plurality of teeth that extend radially from the thinned portion, the plurality of teeth being evenly distributed over the thinned portion.

7. The turbine shaft according to claim 1, wherein at least one through-hole is formed in the secondary tubular segment.

8. The turbine shaft according to claim 1, wherein the weak section is formed on at least one angular sector of the secondary tubular segment.

9. A turbomachine, comprising a turbine comprising the turbine shaft according to claim 1, the secondary tubular segment being arranged downstream of a thrust bearing configured to guide the shaft.

10. A method for protecting against overspeed of a turbine shaft of a turbomachine according to claim 1, the method comprising a step of breaking the weak section when the value of a tangential stress applied to the shaft exceeds a predetermined threshold value.

11. The turbine shaft according to claim 1, wherein the secondary tubular segment is arranged downstream of a thrust bearing configured to guide the shaft.

12. The turbine shaft according to claim 1, wherein the turbine shaft is a low pressure shaft.

13. A turbine shaft of a turbomachine extending along a longitudinal axis (A), comprising a main tubular portion of length L1 and having a maximum outer main diameter, the turbine shaft further comprising a secondary tubular segment of length L2 and having a maximum outer secondary diameter larger than the maximum outer main diameter, the secondary tubular segment extending radially from the main tubular portion such that the main tubular portion extends on either side of the secondary tubular segment along the longitudinal axis (A), the secondary tubular segment comprising a weak section configured to break the shaft into two distinct parts when the value of a rotational speed of the shaft exceeds a predetermined threshold value.

14. The turbine shaft according to claim 13, wherein the maximum outer secondary diameter is at least 1.8 times larger than the maximum outer main diameter.

15. The turbine shaft according to claim 13, wherein the weak section comprises a thinned portion having a maximum inner diameter larger than a minimum inner secondary diameter of said secondary tubular segment, the thinned portion having a maximum outer diameter equal to the maximum outer secondary diameter.

16. The turbine shaft according to claim 13, wherein the length L2 is greater than 0.3 times the maximum outer diameter of the thinned portion.

17. The turbine shaft according to claim 13, wherein the thinned portion extends over not more than 80% of the length L2.

18. The turbine shaft according to claim 13, wherein the thinned portion comprises at least one tooth that extends radially from the thinned portion.

19. The turbine shaft according to claim 13, wherein the thinned portion comprises a plurality of teeth that extend radially from the thinned portion, the plurality of teeth being evenly distributed over the thinned portion.

20. The turbine shaft according to claim 13, wherein the weak section is formed on at least one angular sector of the secondary tubular segment.

* * * * *